Aug. 25, 1970     T. W. BUSHNELL ET AL     3,525,516
SIGNATURE OR SHEET COLLATING SYSTEM
Filed March 6, 1968     3 Sheets-Sheet 1
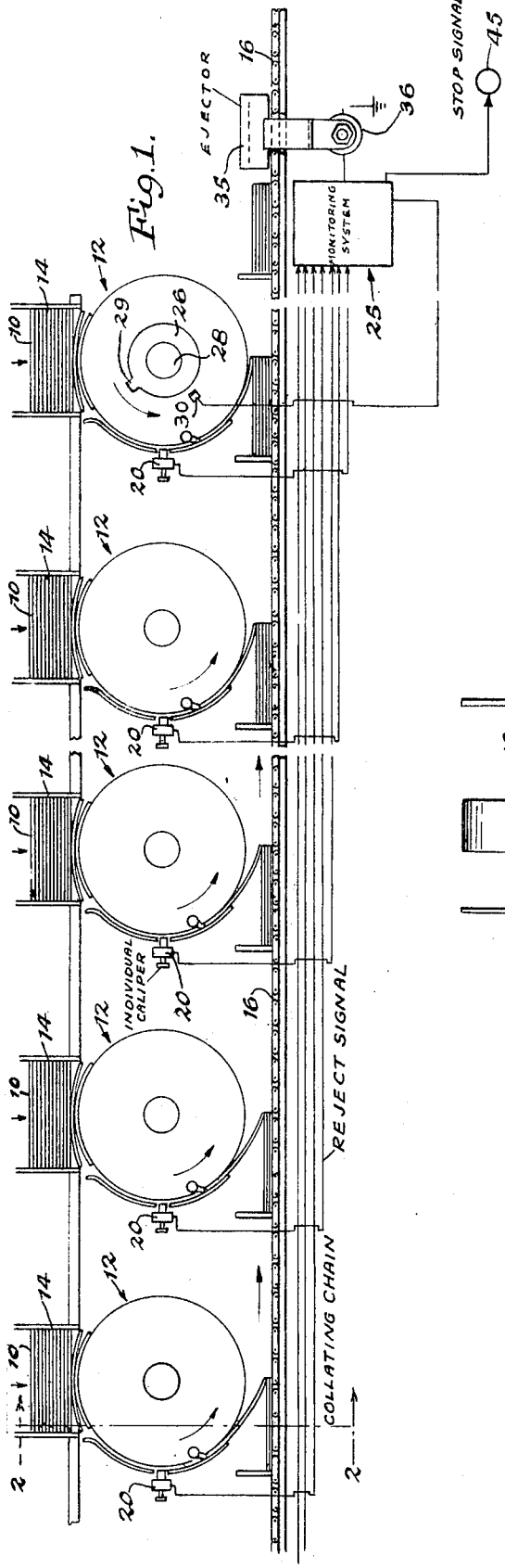
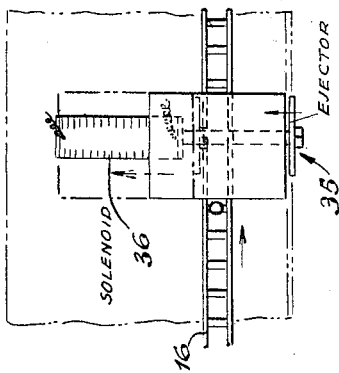
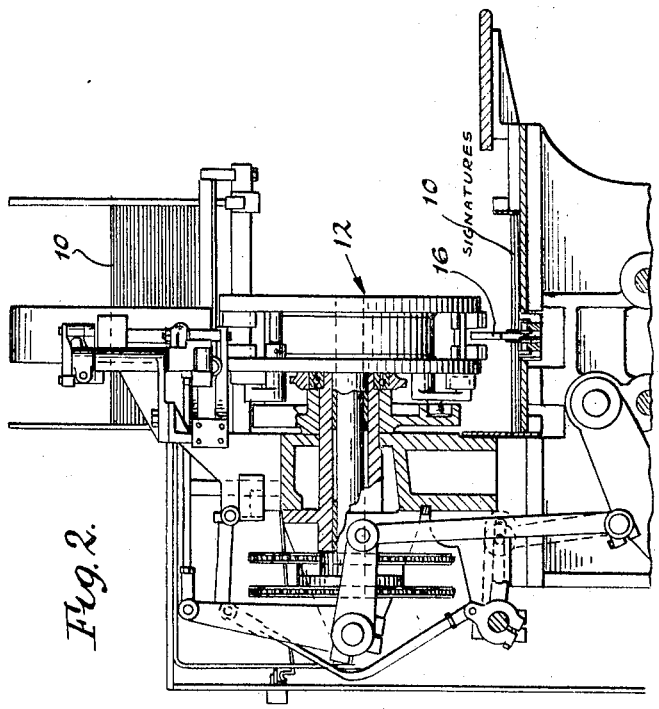
INVENTORS
THOMAS W. BUSHNELL
JOSEPH R. CARSON JR.
JOHN J. NILL
BY
Bean & Bean
ATTORNEYS

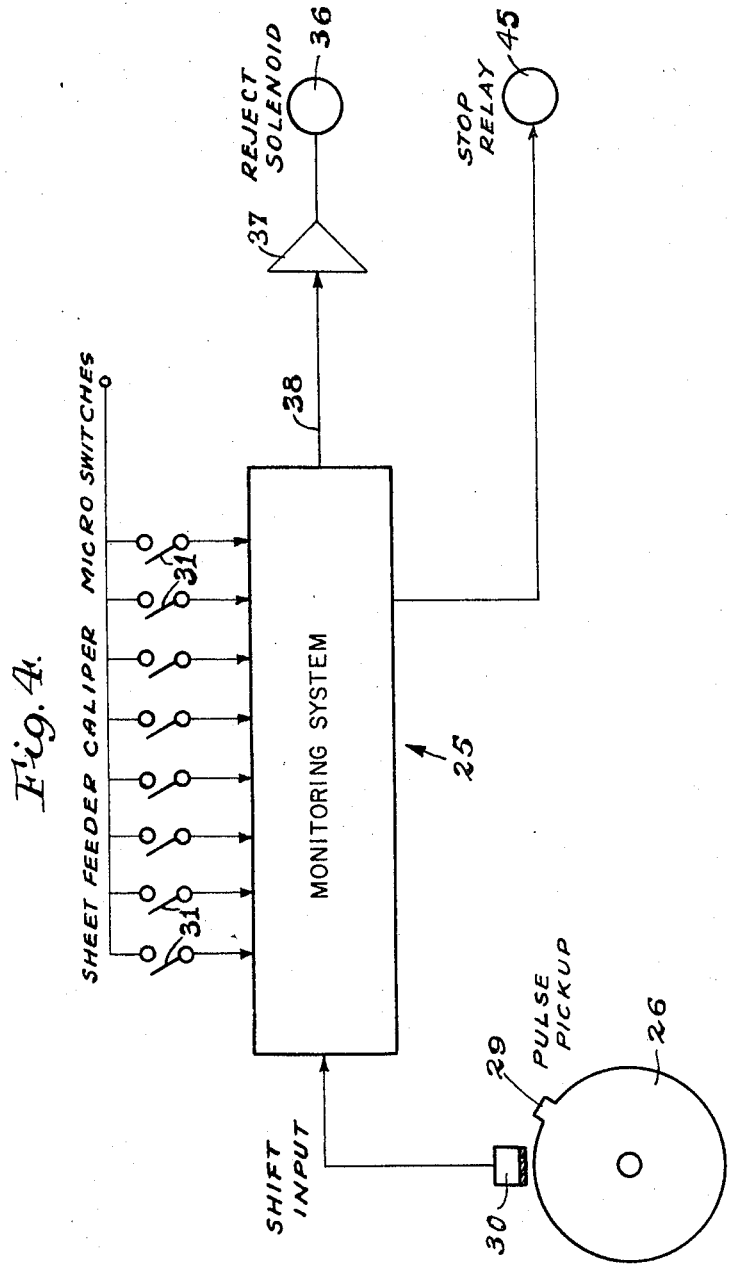

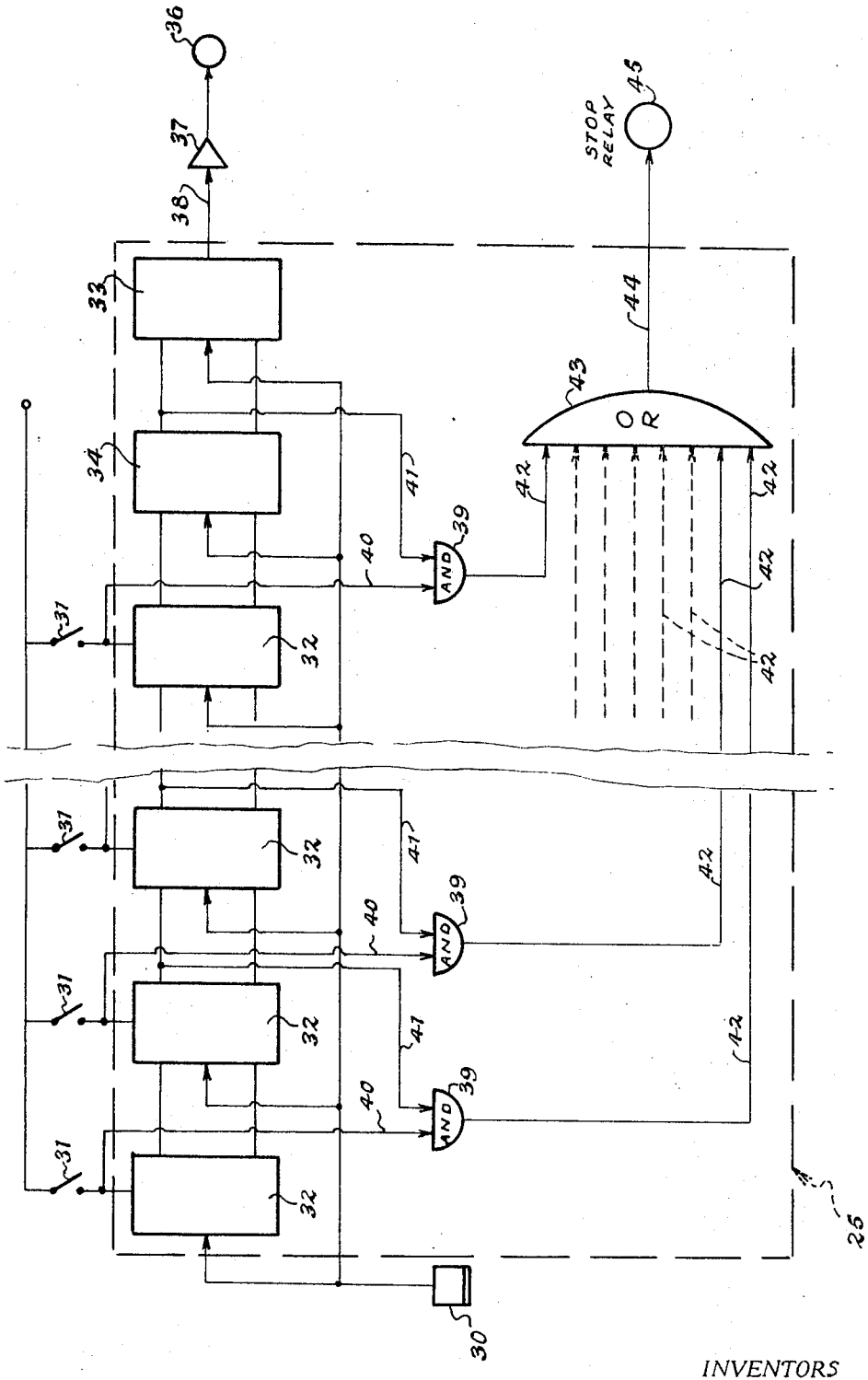

United States Patent Office 3,525,516
Patented Aug. 25, 1970

3,525,516
SIGNATURE OR SHEET COLLATING SYSTEM
Thomas W. Bushnell, East Aurora, Joseph R. Carson, Jr., Lancaster, and John J. Nill, Williamsville, N.Y., assignors to J. W. Clement Company, Depew, N.Y.
Filed Mar. 6, 1968, Ser. No. 711,041
Int. Cl. B42c 1/00; B65h 39/02
U.S. Cl. 270—58            9 Claims

ABSTRACT OF THE DISCLOSURE

The feeders of a signature collating or "gathering" system, each have a calipering device which operates to detect any malfunction in delivery to the collating conveyor. The caliper causes an electric monitor device to receive a storage pulse corresponding to the position of a malfunctioning feeder in the collating system. The storage pulse is then transferred through the shift register of the monitor device in synchronism with the transfer of books through the system and the monitor output is effective to reject the imperfect book at a station beyond the last feeder without interrupting the continuous high speed operation of the system unless more than a predeterminated number of sequential malfunction signals are generated by the same caliper, at which time the operation of the system is stopped.

BACKGROUND OF THE INVENTION

In the bookmaking industry it is conventional practice to provide collating conveyors operating to gather groups of signatures (or sheets) from successively arranged magazine type feeders; such as shown for example in U.S. Pats. 1,655,423; 1,738,180; 2,643,113; 2,711,896; and 3,008-706. Such mechanisms typically employ calipering devices for detecting malfunctioning of any of the feeders on a given line; the calipers being arranged automatically to stop the entire system operation and to give the attendant an appropriate signal as to which feeder malfunctioned. Such malfunctions may result either from a faulty operation of the feeder mechanism per se resulting in a delivery of more or less than the intended number of sheets; or it may have been due to no fault of the feeder but to some transitory problem within the sheet supply system. Malfunctions of the type referred to often occur only momentarily and will not necessarily be repetitive. Nevertheless, any one "book" which has been a victim of a system malfunction is imperfect and must of course be manually corrected before delivery to the subsequent binding operation or the like.

Some efforts have previously been made to design collating systems such as will automatically operate to compensate for transitory malfunctionings at different stations thereof without halting the overall operation, but such mechanisms invariably have proven to be unduly complicated and impracticable from the standpoint of reliability and/or maintenance. Therefore, with a veiw to insuring maximum reliability and feasibility from the capital equipment and maintenance standpoints, it is the presently conventional practice to employ a system whereby whenever a feeder malfunction is detected the entire system is automatically stopped and a signal is provided to guide the attendant to the malfunctioning components. Thus, the imperfect book may then be manually corrected before restarting. Such methods provide for suitable "monitoring" of the product line, but inevitably involve inordinate production interruptions.

With a view to avoiding the aforementioned production interruptions, systems have been designed which call for simply calipering the gathered groups of signatures or "books" as they leave the collating system. Theoretically, any misdelivery of signatures by one or more of the feeders may be detected by a caliper measurement of each book as it reaches the end of the line. However, such methods have been found to be totally unreliable due to the fact that the paper supplied to the printing industries will sometimes vary substantially in thickness, and therefore when gathering a book comprising a plurality of signatures the cumulative thickness variation of the combination will often amount to more than the thickness of one of the signatures per se. Hence, such calipering and control methods are also unreliable.

BRIEF SUMMARY OF THE INVENTION

This invention relates to systems of the type described in which each feeder delivering to the collating conveyor is provided with a malfunction detector, the several detectors being connected to a monitoring system which operates to interrupt operation of the system only if there is an indication of gross malfunction at any one feeder station. Otherwise, the continuous and high speed operation of the system is not interrupted and the monitor instead effects a delayed action rejection of the imperfect book of signatures at a station beyond the last feeder of the system.

It is the primary object of the present invention to provide an improved signature collating system featuring means monitoring the operation of each feeder which is operative (a) to allow the system to continue its high speed operation when intermittent malfunctions occur at the various feeders while ridding the product line of imperfect books stemming from these intermittent malfunctions, and (b) to interrupt operation of the system when a number of successive malfunctions occurs at any one of the feeders. More specifically, it is an object of this invention to provide a collating system as described featuring monitoring of each feeder, the storing of an appropriate "bit" of information in event of any intermittent malfunctioning of the feeder, and subsequent progressive transfer of this "bit" of information through the monitoring means in synchronism with the passage of any imperfect book along the conveyor system, and delivery of a resultant signal to an eject device at the end of the line to cause rejection of the imperfect book as it arrives there, without the slightest slowdown or stoppage of the collating conveyor system. In the event of a train of malfunction signals from the same feeder, an AND gate is used to detect such train by responding to coincidence of the transferred bit originating from the first signal of the train and the last signal of the train, the AND gate output being used for terminating operation of the system. Thus, none but complete books are delivered by the system while approaching the optimum designed production rate.

THE DRAWING

By way of one example of how the invention may be embodied in a collating system, it is illustrated in the accompanying drawing, wherein;

FIG. 1 is a semi-schematic side elevational view of a collating system embodying a control arrangement of the invention;

FIG. 2 is a fragmentary large scale sectional view taken through one of the signature feeders, as indicated by line 2—2 of FIG. 1;

FIG. 3 is a fragmentary plan view of the defective book ejector mechanism illustrated at the right-hand end portion of FIG. 1;

FIG. 4 is a diagrammatic view of the monitoring system and related components; and FIG. 5 is a block diagram illustrating the principal components of the monitoring system.

DETAILED DESCRIPTION

The accompanying drawing illustrates application of the present invention to a signature collating system comprising essentially a line for delivering signatures such as are indicated as at 10. Such feeders as indicated individually at 12 may be of any desired type such as shown in the above referenced patents for example, and form no part per se of the present invention. However, in any case the feeders 12 will be arranged to deliver signatures in succession as from magazines 14 in association with each feeder; the feeders thereby depositing sequentially their corresponding signatures on the collating conveyor which is indicated generally at 16. The conveyor 16 may also be of any preferred type, and forms no part per se of the present invention; but is arranged to travel from left to right as viewed in FIG. 1 to deliver the assembled books at the right hand end of the conveyor, such as to a book binding facility or the like. The conveyor 16 and the feeders 12 are of course driven from a common power source so as to synchronize the delivery of signatures to the conveyor as it advances the signature collations from one feeder to another.

In accordance with the present invention a signature passage detection device as illustrated at 20 is provided in conjunction with each of the feeders at the signature delivery portion thereof, to detect any malfunctioning incidental to the delivery process; such as failure to timely deliver a signature, delivery of more than the intended number of signatures at any delivery time function, or delivery of faulty signatures. Calipering devices of suitable type for this purpose are well known in the art and are commercially available, and form no part per se of the present invention. Whereas in the drawing herewith only five of such feeder and caliper devices are illustrated at FIG. 1 in conjunction with the collating conveyor 16, it will be understood that the number of signature feeders employed in any given installation will depend upon the number of different signatures that are to be collated into book form. Also, it will be understood that the feeders 12 and the conveyor 16 will be driven through a common motor drive system so that the feeders will deliver signatures to the collating signature stacks in properly timed sequential arrangements.

Each caliper 20 is arranged to send an electrical pulse to a monitoring system as illustrated at 25 herein, whenever the feeder in association with such caliper malfunctions in any respect.

In FIG. 4, it will be seen that the monitoring system 25 is driven by a signal produced by the transducer 26. The transducer 26 may be of any form driven in synchronization with the drive means for the system and, as shown, comprises a cam disc having a magnetic element 29 adapted to sweep past the pickup 30 once every revolution of the feeders 12. The shift input pulse produced by this transducer is timed to shift the monitoring system subsequent to operation, if any, of the switches 31 of the individual calipers 20.

To appreciate better the operation and function of the monitoring system, reference is had to FIG. 5 wherein the monitoring system will be seen to include a series of functional elements 32 corresponding in number to the number of feeders involved in the feeder series performing the building of the completed signature books. Further, there is a functional element 33 corresponding to the ejector or reject station which is positioned beyond the last feeder in the series, and one or more intermediate functional elements 34 corresponding to stations between the last feeder in the series and the reject station, the purpose of which will be presently apparent.

The functional elements 32, 33 and 34 are shifting elements connected serially to form a shift register, each of which is connected as shown to the shift input signal. Each of the shifting elements 32 is provided with an input from an associated one of the feeder detector switches 31 so that the information "bit" produced by closure of any one of the switches 31 will be inserted into its corresponding shifting element 32. It will be understood of course that a switch 31 is closed only in response to malfunction associated with that particular feeder. Subsequent to actuation, if any, of any one of the switches 31, continued rotation of the last feeder drum will cause a shift input signal to be applied simultaneously to all of the shifting elements 32, 33 and 34 (see also FIG. 1). By the time this further rotation of the feeders is effected, the completed book A will have reached the station beyond the last feeder of the series at which is located the ejector or reject mechanism 35 and of course all of the other books being built; or, in the case of the last feeder, the book just completed will have been corresponding advanced.

When the shift input is applied to the shifting elements, the malfunction indicating "bit" is advanced forwardly in the shift register so that when the imperfect book stemming from any malfunction signal reaches the reject station, the reject mechanism is actuated to reject the imperfect book as by means of a solenoid 36 connected, through a suitable amplifier 37, to the output 38 of the shift register.

As hereinbefore stated, the monitoring system according to the present invention is capable of rejecting individual books without causing stoppage of the collating system but is also capable of stopping the collating system if there is an indication of gross malfunction at any one feeder. This latter function is achieved in the specific example shown in FIG. 5 by providing a second means in the monitoring system (the first means being the shift register) which is capable of detecting the presence of a train of successive malfunction signals from any one of the switches 31, which train consists of a number of predetermined successive pulses from the same switch 31 which exceeds some predetermined maximum. For example, in the specific example shown in FIG. 5, any switch 31 which indicates two successive malfunction signals will cause the collating system to be stopped.

This second means, as shown, comprises a plurality of AND gates 39, there being one AND gate corresponding to each of the shifting elements 32. One input to each AND gate is, as indicated by the reference character 40, connected directly to the associated feeder detector switch 31 and the other input as indicated by reference character 41 is connected to the transfer leg of the next succeeding shifting element 32 or, in the case of the AND gate 39 corresponding to the last feeder of the series, the second input 41 is connected to the next succeeding intermediate shifting element 34. It will be appreciated that if both of the inputs 40 and 41 indicate a malfunction signal, this corresponds to two successive malfunction signals from the same detector switch 31 and the output at 42 of the particular AND gate 39 involved will pass through the OR gate 43 to produce an output at 44 for actuating a relay 45 which interrupts the drive to the collating system.

From a practical consideration of the problem, it has been found that a train of two pulses from the same detector switch 31 usually means that a gross malfunction has occurred incidental to that particular feeder. It will be appreciated that the presence of the intermediate shifting element 34 is necessary to perform the logic for stopping operation of the system due to gross malfunction at any feeder and it will be appreciated that the ejector 35, in the particular instance shown in FIG. 5, will be required to be displaced from the last feeder of the series by a distance corresponding to two feeder stations. It will also be appreciated that the feeder stations are equidistantly spaced since the reject mechanism and system operate on a linear base.

Thus it will be appreciated that if at any time any one of the caliper devices 20 sends an impulse to the monitoring system 25 indicating that its signature feeder has malfunctioned, the shift register will "follow" the signature collation which has thus been identified as "defective" throughout the extent of the collating system; and that upon its arrival at the reject station it will be kicked out of the delivery line; all without any slowdown or interruption of the collating and delivery processes.

The monitoring system 25 also includes second means which recognizes continuing malfunctions at any one feeder, such as may more rarely occur for example upon mechanical or electrical breakdown of the machine or by reason of jamming of signatures in the magazine; or any other continuing malfunctionings of the feeder. Therefore, the monitoring system includes the AND gate means 39. This second means may comprise any suitable signal accumulating mechanism, which upon receipt of any prescribed number of consecutive signals from any one caliper source, will send an operative pulse to the mechanism drive control 45 so as to effect an immediate stoppage of the entire system. The device may of course be adjusted to function in accordance with any number of consecutive malfunctions of any one feeder; such as two or more malfunctions, as may be preferred.

Thus it will be appreciated that the present invention provides a mechanism which immediately detects any individual malfunctioning of any one signature feeder, and stores this bit of information in a shift register; which shift register advances in synchronism with advancement of the signature collating process as a whole; and whereby the signature collation being thereby identified as "defective" is kicked off the delivery line, thereby insuring delivery of only perfect books. This objective is achieved without slowing down the overall operation to any degree, or by interrupting it with stoppages, such as have been heretofore necessary in connection with systems of the prior art, and which have been so detrimental to the production rates thereby achieved. At the same time, provision is made for stopping the collating system when gross malfunction at any one feeder is indicated.

Also, it will be appreciated the inventive concept as set forth hereinabove is not limited to the employement of machine system components as illustrated and described hereinabove. The signature feeders and caliper devices to be employed may be of any other suitable type, and any suitable type of collating conveyor may be employed. Also, the reject device may be selected from a large variety of suitable mechanically, electrically, hydraulically, or pneumatically operated types; and therefore it will be understood that athough only one form of the invention has been illustrated and described in detail hereinabove, various changes may be made therein without departing from the spirit of the invention or the scope of the appended claims. It will also be understood that the term "signature" as used herein is intended to mean a single non-folded sheet as well as folded or plural sheets.

What is claimed is:

1. In a collating system of the type having a collating conveyor, a series of feeders for delivering individual signatures to the collating conveyor progressively to build at spaced stations along the conveyor the books of signatures each of which books is completed at the last feeder of the series, detector means associated with each feeder for detecting a malfunction which would produce an imperfect book, and drive means for synchronously operating said collating conveyor and said feeders in continuous, high speed fashion, the improvement comprising:

monitoring means for interrupting operation of said drive means only in response to indication of gross malfunction at any one feeder and otherwise to allow continuing operation of the drive means while ejecting an imperfect book at a station beyond the last feeder of the series, said monitoring means including rejecting means located at a station beyond said last feeder of the series, first means responsive to detection of a single malfunction at any feeder for actuating said rejecting means when the imperfect book stemming from the malfunction reaches said station beyond the last feeder of the series, and second means responsive to detection of a succession of malfunctions at any one feeder whose number exceeds a predetermined maximum for interrupting said drive means.

2. In a signature insert gathering system of the type having a plurality of aligned feeders for delivering individual signatures therefrom, conveyor means for receiving the individual signatures, drive means for operating said feeders and said conveyor means in synchronization whereby a line of progressively collated signatures are built up at spaced stations along the conveyor means as the conveyor means passes the feeders ultimately to provide books of signatures, detecting means associated with each feeder for ascertaining a malfunctioning of any delivery operation, the improvement comprising:

monitor means actuated by said detecting means for delayed action diversion of an imperfect book of signatures at a station following the last in line feeder, and said monitor means including secondary monitor means for interrupting said drive means in response to a predetermined number of sequential malfunctions detected at any one of said feeders.

3. In the collating system as defined in claim 1 wherein said first means comprises a shift register having shifting elements serially connected therein and means for producing a shift register input to said shifting elements for every feeder cycle.

4. In the collating system according to claim 3 wherein said second means includes an AND gate associated with each of said shifting elements, each of said AND gates having one input connected to a corresponding detector means and a second input connected to the transfer leg of the next succeeding shifting element.

5. In a collating system of the type having a collating conveyor, a series of feeders for delivering individual signatures to the collating conveyor progressively to build books of signatures at spaced stations along the conveyor, each of which books is completed at the last feeder of the series, detector means for detecting a malfunction associated with each feeder which would produce an imperfect book, and drive means for synchronously operating said collating conveyor and said feeders in continuous, high speed fashion, the improvement comprising:

monitoring means for ejecting an imperfect book at a station beyond the last feeder of the series, said monitoring means comprising a shift register having a shifting element associated with each of said feeders, means for producing a shift register input for every feeder cycle, and rejecting means located at said station beyond the last feeder of the series, each of said shift elements of the monitoring means having inputs from one of said detector means associated with a corresponding feeder, there being a further shifting element corresponding positionally to said station beyond the last feeder in the series.

6. In a collating system of the type having a collating conveyor, a series of feeders for delivering individual signatures to the collating conveyor progressively to build books of signatures at spaced stations along the conveyor, each of which books is completed at the last feeder of the series, detector means associated with each feeder for detecting a malfunction which would produce an imperfect book, rejection means for rejecting an imperfect book at a station beyond said last feeder of the series, and drive means for synchronously operating said collating conveyor and said feeders in continuous, high speed fashion, the improvement comprising:

monitoring means for actuating said rejection means, said monitoring means including a shift register having shifting elements corresponding one with each of said feeders, said shifting elements being serially interconnected, each of said shifting elements being connected to one of said detector means associated with a corresponding feeder such that a malfunction indicating signal may be inserted thereinto; and means for producing a shift register input for every signature delivery operation, whereby a malfunction signal inserted in any one of said shifting elements is shifted to a next succeeding shifting element in response to each said shift register input and to ultimately actuate said rejection means.

7. In a collating system as defined in claim 6, wherein said monitoring means further includes second monitoring means for interrupting said drive means in response to a predetermined number of sequential malfunctions detected at any one of said feeders.

8. In a collating system as defined in claim 7, wherein there is a further shifting element connected serially to the last shifting element of said shift register, and said second monitoring means includes an AND gate associated with each of the shifting elements of said shift register, each of said AND gates having one input connected to detector means associated with a corresponding feeder and a second input connected to a transfer leg of the next succeeding shifting element, each AND gate having an output, and means connected to said AND gate outputs for interrupting said drive means in response to any one of said outputs.

9. In a collating system as defined in claim 8, wherein said interrupting means includes an OR gate to which said outputs of said AND gates are connected.

References Cited
UNITED STATES PATENTS

| | | | |
|---|---|---|---|
| 2,917,168 | 12/1959 | Faeber | 270—54 X |
| 3,141,540 | 7/1964 | Burkhardt | 209—72 X |
| 3,311,368 | 3/1967 | Sarring et al. | 270—54 |

JEROME SCHNALL, Primary Examiner

P. V. WILLIAMS, Assistant Examiner

U.S. Cl. X.R.
209—72; 270—54